United States Patent
Roberts et al.

(10) Patent No.: US 7,369,578 B2
(45) Date of Patent: May 6, 2008

(54) DIGITAL PROCESSING OF SONET POINTERS

(75) Inventors: Kim B Roberts, Nepean (CA); James Harley, Nepean (CA); Philippe Neusy, Ottawa (CA); Michael Mayer, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 991 days.

(21) Appl. No.: 10/609,562

(22) Filed: Jul. 1, 2003

(65) Prior Publication Data

US 2005/0002403 A1    Jan. 6, 2005

(51) Int. Cl.
   *H04J 3/06*      (2006.01)
   *H04L 7/00*      (2006.01)

(52) U.S. Cl. .................. 370/506; 370/516; 375/371

(58) Field of Classification Search ........... 370/395.51, 370/907, 503, 505, 506, 516; 375/345, 354, 375/371, 372
See application file for complete search history.

(56) References Cited

U.S. PATENT DOCUMENTS

| | | | |
|---|---|---|---|
| 5,263,057 A | | 11/1993 | Nawrocki et al. |
| 5,337,334 A | * | 8/1994 | Molloy ...................... 375/372 |
| 5,436,937 A | * | 7/1995 | Brown et al. ............... 375/376 |
| 5,463,351 A | * | 10/1995 | Marko et al. ................ 331/1 A |
| 6,415,006 B2 | * | 7/2002 | Rude ........................ 375/372 |
| 7,023,942 B1 | * | 4/2006 | Roberts et al. ............. 375/356 |

FOREIGN PATENT DOCUMENTS

| | | |
|---|---|---|
| EP | 0 460 835 A | 12/1991 |
| WO | WO 03/032540 A | 4/2003 |

OTHER PUBLICATIONS

Duttweiler D L: "Waiting Time Jitter", Bell System Technical Journal, American Telephone and Telegraph Co. New York, US, vol. 51, No. 1, 1972, pp. 165-207, XP000608817.
W.D. Grover, et al., "Waiting Time Jitter Reduction by Synchronizer Stuff Threshold Modulation", Proceedings of IEEE Glovecom, 1987, vol. 1, pp. 514-518.
D.L. Duttweiler, "Waiting Time Jitter", The Bell System Technical Journal, vol. 51, No. 1, Jan. 1972, pp. 165-207.
Richard G. Kusyk, et al. Analysis of Tenchniques for the Reduction of Jitter Caused by SONET Pointer Adjustments, IEE Transactions on Communications, vol. 42, No. 2/3/4 Feb.-Apr. 1994, pp. 2036-2050.

* cited by examiner

*Primary Examiner*—Chi Pham
*Assistant Examiner*—Tri H. Phan
(74) *Attorney, Agent, or Firm*—Kent Daniels; Ogilvy Renault LLP

(57) ABSTRACT

In a method of estimating a bit rate (f1) of a digital signal conveyed through a SONET network between an originating node and a terminating node, the digital signal received by the originating node is processed to determine a result of a first function of the signal bit rate (f1) and a respective Tx local reference frequency (f2) of the originating node. A result of a second function of the Tx local reference frequency (f2) and a respective Rx local reference frequency (f3) of the terminating node is calculated. Finally, a result of a third function of the respective first and second function results is calculated, to derive an estimate of the signal bit rate (f4) relative to the Rx local reference frequency (f3).

58 Claims, 8 Drawing Sheets

DIGITAL PROCESSING OF SONET POINTERS

CROSS-REFERENCE TO RELATED APPLICATIONS

This is the first application filed for the present invention.

MICROFICHE APPENDIX

Not Applicable.

TECHNICAL FIELD

This invention relates to communications networks, and in particular to a method for digitally processing SONET pointers.

BACKGROUND OF THE INVENTION

Within the modern network space, the Synchronous Optical Network (SONET)/Synchronous Digital Hierarchy (SDH) protocol is becoming increasingly popular as a mechanism for data transport. In this respect, SDH is the European equivalent of the SONET transmission standard. Accordingly, all references in this application to SONET should be understood to also refer to SDH.

A significant amount of SONET/SDH infrastructure has been installed, particularly within the network core. This SONET infrastructure is used to transport asynchronous subscriber signal traffic having differing formats, such as Asynchronous Transfer Mode (ATM), Internet Protocol (IP), etc. In order to facilitate this functionality, various known methods are provided for mapping the asynchronous subscriber traffic into Synchronous Transfer Signal (STS/STM) frames for transport across the SONET infrastructure, and then extracting the subscriber traffic out of the STS to recover the original subscriber signal format.

FIG. 1a is a block diagram schematically illustrating principal operations of a conventional transmitting node 2 of an optical communications system. As shown in FIG. 1a, asynchronous subscriber traffic within multiple tributaries 4 is received by the node 2 and buffered in an elastic store 6. The traffic may comprise any arbitrary mix of signals, including DS-1, DS-3 and E1 traffic. Traffic within each tributary 4 is normally buffered in a respective First-In-First-Out (FIFO) buffer 8. The timing of this buffering operation is controlled by a data clock signal 10 having a frequency f1 generated by a tributary clock recovery circuit 12. A synchronizing framer 14 reads data from each FIFO 8, and maps the read data into corresponding tributaries of a number of SONET Synchronous Payload Envelopes (SPEs) 16, using a known format such as those defined in the SONET standard. Each SPE 16 is then passed to a channel transmitter (Tx) 18, which inserts the SPEs into an STS frame, and then modulates the STS frame onto an optical channel carrier 20 for transmission through the optical network. A Tx local clock 22, which is synchronous with a SONET Primary Reference 24, generates a respective TX local clock signal 26 having a frequency f2, which is used to control operation of the synchronizing framer 14 and channel Tx 18.

As is known in the art, the number and size of the SPEs 16 are selected based on the channel line rate. For example, for a channel line rate of 10 Gb/s, the synchronizing framer 14 may map subscriber traffic into a set of four STS-48 envelopes. Other combinations may equally be used, such as, for example, eight STS-12 envelopes.

Normally, a respective buffer fill signal 28 is generated for each tributary FIFO 8, and used to control the insertion of stuffing bits into the corresponding SPE tributary.

As shown in FIG. 1b, at the terminating node 30, the incoming STS 20 is decoded by a channel receiver (Rx) 32 and processed by a pointer processor 34 to demap each SPE tributary from the STS 20. Thus, stuffing bits are stripped out of each tributary, and the remaining subscriber data stored in a respective tributary FIFO 36 of an elastic store 38. An Rx local clock signal 40, having a frequency f3 which is preferably referenced to the SONET Primary Reference 24, is supplied to a desynchronizer Phase locked Loop (PLL) 42. A buffer fill signal 44 generated by the tributary FIFO 36 is used to steer the Phase locked Loop (PLL) 42, so that the PLL output constitutes a recovered data clock signal 46 having a frequency f4 which approximates the data rate of the subscriber traffic. As a result, by reading data from the tributary FIFO 36 at a timing of the recovered data clock 46, a desynchronizer framer 48 can generate a recovered subscriber signal 50 in which the original timing is closely approximated.

For cases in which the channel line rate is equal to or greater than the subscriber data rate (i.e. for $f1 \leq f2$), the introduction of idle packets to replace "missing" subscriber traffic enables the synchronizing and desynchronizing framers 14 and 48 to compensate any differences between the tributary data rate and the channel rate. However, this mapping technique suffers a limitation in that the fill signal 44 of the Rx tributary FIFO buffer 3b tends to vary in a step-wise manner as idle packets are inserted and striped from SPE tributaries. This causes timing jitter in the recovered subscriber signal 50.

In most situations, the amount of timing jitter introduced by mapping and demapping asynchronous client signal traffic to and from STS frames does not create any difficulties. However, if the timing of the subscriber signal is critical, such as an HDTV signal or a subscriber-originated SONET signal (e.g. for SONET over SONET applications) the introduced timing jitter can noticeably degrade the quality of the subscriber's signal. Accordingly, there is interest in methods that enable subscriber traffic to be transparently mapped on to SONET STS signals. An important aspect for transparency is to preserve the original timing information of the subscriber signal.

Applicant's U.S. patent application Ser. No. 09/972,686 (Roberts et al.), entitled Method and Apparatus for Digital Data Synchronization, which was filed on Oct. 9, 2001, which issued to U.S. Pat. No. 7,023,942 on Apr. 4, 2006, teaches a method of rate adapting an asynchronous subscriber signal on to SONET STS frames without incurring waiting time jitter, by measuring the phase and frequency of the (asynchronous) subscriber signal and encoding this information into the frame overhead. Thus, as shown in FIG. 2a, a multi-bit digital timing estimate (F) is calculated (at 52) to indicate the difference between the tributary data rate f1, and the Tx local clock frequency f2. In the embodiment of FIG. 2a, the timing estimate F is computed as a ratio between f1 and f2. In other embodiments, the timing estimate F may be computed as a phase difference between the subscriber data signal and Tx local clock signal, calculated at the time that a corresponding client data block is mapped into the SPE. In either case, the timing estimate F is supplied to the synchronizing framer 14 and used in place of the tributary fill 28 to control the insertion of stuff bytes into the SPE tributary. The timing estimate F is also inserted into the SUE tributary and conveyed with the subscriber data to the terminating node 30.

As shown in FIG. 2b, at the terminating node 30, the pointer processor 34 demaps each SPE tributary, and extracts the timing estimate F. The timing estimate F extracted from the SPE tributary is used in place of the elastic store fill signal 44 to steer the desynchronizer Phase locked Loop (PLL) 54. Consequently, the PLL output constitutes a recovered data clock signal 56 having a frequency f4 which more closely approximates the original frequency f1 of the subscriber traffic. As a result, by reading subscriber data from the tributary FIFO 36 at a timing of the recovered data clock 56, the desynchronizer framer 48 can generate a recovered subscriber signal 50 in which the original timing is substantially restored.

An important attribute of U.S. Pat. No. 7,023,942 is that the timing estimate F enables the transparent transport of the subscriber's original phase variations over a reasonable bandwidth (e.g. 100 Hz-1 KHz). Traditionally, waiting time jitter is reduced by narrowing the bandwidth of the desynchronizer PLL 42 (see FIG. 1b). However, very narrow filtering at the desynchronizer PLL 42 has the effect of attenuating the subscriber signal's phase variations and hence looses some transparency of the subscriber timing characteristics. U.S. Pat. No. 7,023,942 overcomes this limitation by the accurate measurement of subscriber phase/frequency at the synchronizer 2. This information is encoded within the STS frame (in the form of timing estimate F) and used to steer the desynchronizer PLL 54, which substantially eliminates waiting time jitter.

Another important attribute of U.S. Pat. No. 7,023,942 is that, unlike conventional systems, an elastic store fill signals 28 and 44 are not used to control insertion of stuff bytes at either the transmitting or receiving nodes 2, 30. This avoids problems due to the fill signals 22 and 44 containing clock noise, cross-talk from other signals, and data patterning. Instead of the elastic store fill signals 22 and 44, U.S. Pat. No. 7,023,942 uses the timing estimate F as an accurate measurement of the subscriber phase/frequency to drive stuffing at the transmitting node 2 and generation of the recovered data clock signal 56 at the receiving node 30.

A limitation of U.S. Pat. No. 7,023,942 is that subscriber signal phase and frequency information (F) is measured with respect to the Tx local clock signal 26 (FIG. 2a) at the originating node 2, whereas the recovered data clock signal 56 generated by the desynchronizer PLL 54 is based on the Rx local clock signal 40 at the terminating node 30. Ideally, both of the Tx and Rx clock signals 26 and 40 are derived from the same SONET primary reference 24, and thus will be synchronous. However, the originating and terminating nodes 2 and 30 may well be situated in different SONET islands, with the result that there may be a frequency difference ($\Delta f$) between the Tx and Rx local clock signals 26 and 40. Any such frequency difference means that the recovered data clock frequency f4 will not precisely match the original subscriber data frequency f1, and thus accurate recovery of the original timing of the subscriber signal may not be possible.

The SONET standard provides a method for frequency aligning an incoming SONET signal at a SONET network element using the payload pointers (e.g. the H1, and H2 bytes) within the Transport Overhead (TOH). These pointers provide a positive or negative word stuff of size 8*N bits for an STS-N signal. For a positive stuff, the start position of data in the Synchronous Payload envelope (SPE) is advanced by 8*N bits, and for a negative stuff, the start position is pushed back by 8*N bits. In principle, the positive and or negative stuff indications that arrive at the terminating SONET node provides a measure of the relative frequency difference between the originating and terminating nodes.

However, a pointer change (i.e. a positive or negative stuff indication) is typically generated when, at an elastic store between the synchronous write and read clocks, the elastic store fill exceeds a predetermined threshold. These pointer changes represent large phase changes in the subscriber data (equivalent to 8*N bits) and occur at a worst case nominal stuffing ratio of zero (see D. L. Duttweiler, "Waiting Time Jitter" Bell System Technical Journal, vol. 51, pp 165-207, January, 1972), which means they can induce a large jitter/wander penalty on the data payload arriving at the terminating node 30. As well, these pointer changes may have been generated by clock noise or cross-talk, due to the fact that they are driven by an elastic store fill signal.

Various methods have been proposed for reducing the jitter/wander penalty imposed by pointer changes. For example, a common method is to simply allow the large phase step due to the pointer change to occur in the Rx elastic store 38, and filter this phase step directly into the desynchronizer PLL 42 using, for example, a low-pass filter 58 (FIG. 1b). This method directly couples the pointer filtering with the desynchronizer function, which means that the pointer and desynchronizer functions cannot be optimized independently.

The publication "Analysis of Techniques for the Reduction of Jitter Caused by SONET Pointer Adjustments", Kusyk et al., IEEE Transaction on communications, Vol. 42, pp 2036-2050, describes a "pointer leaking" method in which, when a pointer is received, bits corresponding to the pointer are leaked from a first elastic store to a second elastic store (not shown) in order to reduce the slope of the phase change. The second elastic store fill drives the desynchronizer PLL 42, via a low pass filter 58 in a conventional manner.

The publication "Waiting Time Jitter Reduction by Synchronizer Stuff Threshold Modulation", W. D. Grover et al., Proceedings of IEEE GLOBECOM '87, vol. 1, pp 514-518, describes a threshold modulation method, which involves encoding word stuffing at the synchronizer such that a traditional desynchronizer can largely filter the frequency of the word stuffs. Again this method uses the elastic store fill 44 to drive the desynchronizer PLL 42, which again implies that the pointer and desynchronizer functions cannot be optimized independently.

As described above, prior art techniques focus on the problem of reducing the jitter imposed on the subscriber signal by pointer changes through the network. Hence the prior art does not address the problem of how to jointly optimize pointer filtering with transparent synchronizer/desynchronizer operation. Nor does the prior art address the question of how to process pointer filters for SONET over SONET applications.

Accordingly, a method and apparatus capable of accurately estimating the bit rate of subscriber traffic conveyed through a synchronous network between different SONET islands remains highly desirable.

SUMMARY OF THE INVENTION

An object of the present invention is to provide a method and apparatus for accurately estimating the bit rate of subscriber traffic conveyed through a synchronous network between different SONET islands.

Accordingly, an aspect of the present invention provides a method of estimating a bit rate (f1) of a digital signal conveyed through a SONET network between an originating node and a terminating node. The digital signal received by the originating node is processed to determine a result of a first function of the signal bit rate (f1) and a respective Tx local reference frequency (f2) of the originating node. A result of a second function of the Tx local reference frequency (f2) and a respective Rx local reference frequency (f3) of the terminating node is calculated. Finally, a result of a third function of the respective first and second function results is calculated, to derive an estimate of the signal bit rate (f4) relative to the Rx local reference frequency (f3).

A further aspect of the present invention provides a method of estimating a relationship between a Tx local reference frequency (f2) of an originating node and an Rx local reference frequency (f3) of a terminating node of a SONET network. An STS/STM signal is conveyed through the network between the originating node, and received at the and terminating node. Each successive payload pointer of the received STS/STM signal is processed to generate a corresponding pointer parameter. The pointer parameters are filtered to derive an estimate of the relationship between the Tx local reference frequency (f2) and the Rx local reference frequency (f3).

A still further aspect of the present invention provides A method of desynchronizing asynchronous subscriber traffic conveyed through a synchronous network. An STS/STM signal encapsulating the subscriber traffic is received at a terminating node of the network. The STS signal includes a timing estimate (F) indicative of a frequency difference between a data rate (f1) of the subscriber traffic and a Tx local reference frequency (f2) of an originating node of the network. The encapsulated subscriber traffic is buffered within an elastic store. Each successive payload pointer of the received STS/STM signal is processed to generate a corresponding pointer parameter. These pointer parameters are digitally filtered to derive an estimated relationship ($\Delta f$) between the Tx local reference frequency (f2) and an Rx local reference frequency (f3) of the terminating node. The local reference frequency (f3) is then adjusted using the timing estimate (F) and the estimated relationship ($\Delta f$), to generate a recovered clock signal having a frequency (f4) that substantially equals the data rate (f1) of the subscriber traffic. Finally, the buffered asynchronous subscriber traffic is read at a timing of the recovered clock signal.

An important application for transparent signal transport is SONET over SONET, in which a SONET signal is encapsulated transparently over another SONET signal. For example, the emerging G. Modem standard (G.709 standard) utilizes an STS-192 signal, which is encapsulated within ODU-2 (G.709 standard), which, in turn, is encapsulated within an STS-204 for transport across SONET infrastructure. In this scenario, any pointer changes in the STS-204 line overhead must be filtered in order to desynchronize the STS-192 embedded in the ODU-2, and preserve the original STS-192 phase and timing. The present invention enables this operation, even across differing SONET islands.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method an apparatus for accurately estimating the bit rate of subscriber traffic received through a synchronous network having two or more SONET islands. Embodiments of the invention are described below with reference to FIGS. 3-5.

In general, the present invention operates by filtering pointer parameters to estimate a relationship between the Tx reference frequency (f2) at an originating node and the Rx reference frequency (f3) at the terminating node. This relationship can then be used for various purposes, such as, for example, estimating the bit rate of subscriber traffic relative to the Rx reference frequency (f3). Pointer parameters may take any of a variety of forms, such as, for example, payload pointer changes, or pointer rates. As may be appreciated, the relationship between the Tx reference frequency (f2) and the Rx reference frequency (f3) may be represented in various ways, depending on how the information is to be used. Exemplary formulations include: a frequency difference ($\Delta f$) between the Tx and Rx clock frequencies; a phase difference ($\Delta P$); a ratio $$\left(e.g.\ \frac{f2}{f3}\ \text{or}\ \frac{f3}{f2}\right)$$

between the Tx and Rx clock frequencies; or any other suitable function of the Tx and Rx reference frequencies, such as $$\left(1-\frac{f2}{f3}\right).$$

For ease of description, the relationship between the Tx and Rx local reference frequencies will be generically referred to herein as the frequency difference ($\Delta f$), it being understood that any of the above formulations may equally be used, and may in fact be preferable, in certain circumstances.

Figure 3:
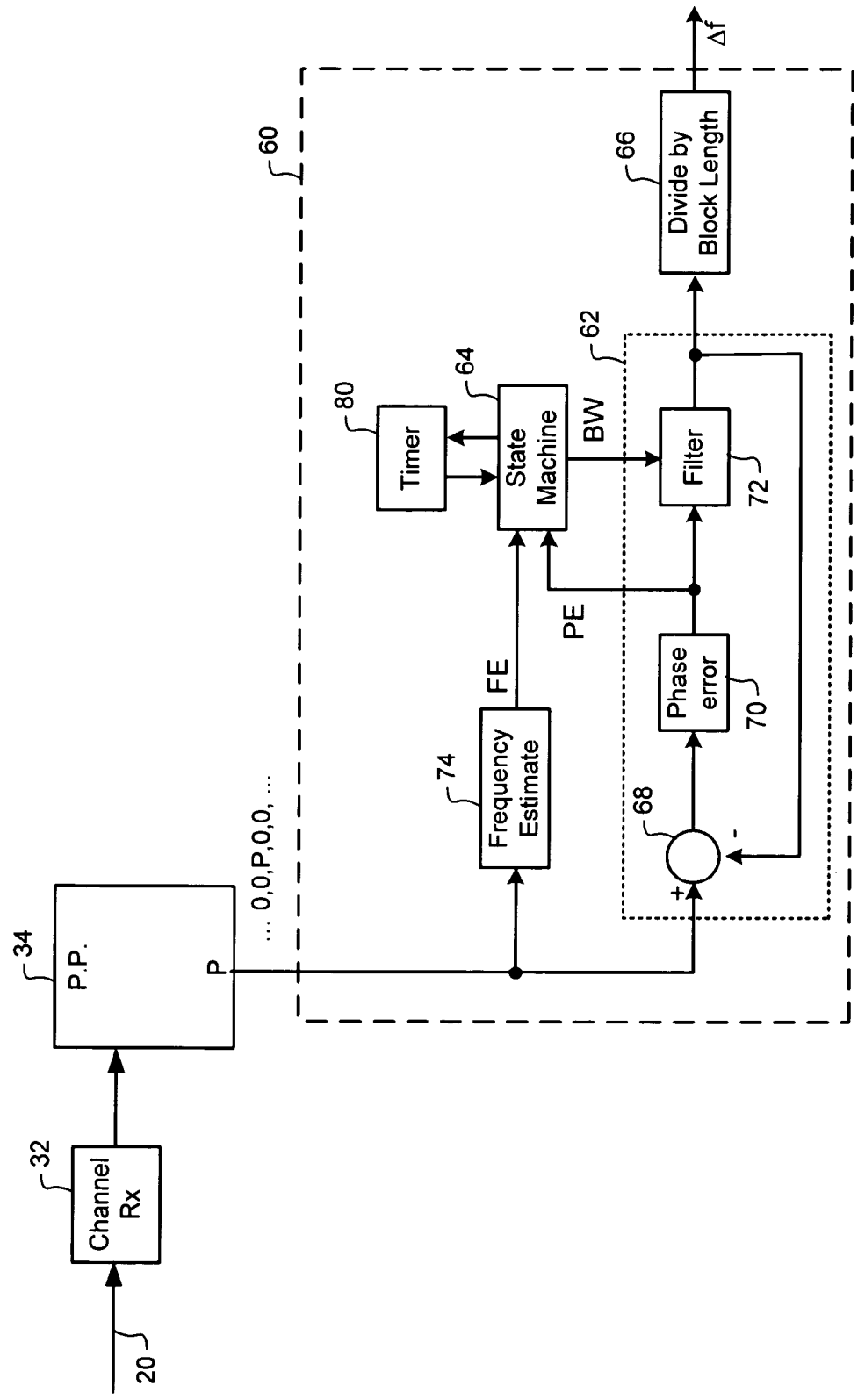
FIG. 3 is a block diagram schematically illustrating principal elements of a pointer filter in accordance with the present invention.

As shown in FIG. 3, the present invention can be implemented using a pointer filter 60 coupled to receive payload pointer changes from the pointer processor 34 of the terminating node 30. The pointer filter 60 processes the payload pointer changes to generate a multi-bit estimate of the frequency difference (Δf) between the Tx and Rx local clock signals. Operation of the pointer filter 60 to calculate the frequency difference (Δf) between the Tx and Rx local clock signals is described below.

As is known in the art, the Synchronous Payload Envelope (SPE) is permitted to float within the STS frame. The starting position of the SPE within the STS frame payload capacity is denoted by a payload pointer located in the H1 and H2 bytes of the line overhead (LOH). As the frame traverses the network, differences between the frame rate and the SPE rate (for example, due to a SONET reference frequency difference between SONET islands) will result in periodic changes in the payload pointer values. The presence of a pointer change can be identified by the value of the "New Data Flag" (NDF) located in bits 1-4 of the payload pointer. The sign of the change is indicated by inversion of either bits 7, 9, 11, 13 and 15 (the I-bits of the payload pointer) in the case of a positive change, or bits 8, 10, 12, 14 and 16 (the D-bits of the payload pointer) in the case of a negative change. According to the SONET standard, payload pointer changes are implemented by incrementing the value of the payload pointer by one. Thus the rate of pointer changes (relative to the payload pointer frequency within the STS signal), and the stuff word size, provides a direct measure of the difference between the STS frame rate and the SPE rate, and thus the difference (Δf) between the Tx and Rx reference frequencies (f2 and f3).

As each STS frame arrives at the terminating node 30, the pointer processor 34 operates to examine the payload pointers within the TOH and forward corresponding pointer change information to the pointer filter 60. In the illustrated embodiment, if the NDF value indicates no change in the payload pointer, then the pointer processor 34 sends a "Zero" indication to the pointer filter 60. On the other hand, if the NDF value indicates that the payload pointer has changed, then pointer processor 34 determines the sign of the change (e.g. positive or negative) and sends a corresponding indication to the pointer filter 60. This means that the pointer filter 60 will receive a respective pointer change indication (e.g. positive, negative or zero) for each payload pointer received by the pointer processor 34.

As shown in FIG. 3, the pointer filter 60 generally comprises a digital phase locked loop (DPLL) 62 controlled by a state machine 64, and a digital divider 66. The output of the digital divider 66 is a multi-bit low noise estimate of the frequency difference (Δf).

The DPLL 62 is formed by a digital ADDER 68, a phase error calculator 70, and a digital filter block 72 controlled by the state machine 64. The digital ADDER 68 operates to add the pointer change indications received from the pointer processor 34 to the negative of the digital filter output. The resulting digital signal is supplied to the phase error calculator 70, which computes an estimate of the phase error (PE) of the SPE using, for example, an operator of the form $$\frac{1}{1-z^{-1}},$$

where z represents the current output value of the digital ADDER 68.

The phase error estimate (PE) is supplied to the state machine 64 and the digital filter 72. The state machine 64 uses the phase error estimate PE for managing state transitions, as will be described below. The digital filter 72 operates to filter the phase error estimate (PE) using, for example, an operator of the form:

$$\frac{2^{-g}(1+2^{-n}+(2^{-n}-1)z^{-1})}{1-z^{-1}}$$

where z is the current phase error estimate (PE), and (n) and (g) are parameters supplied by the state machine 64. As may be appreciated, the parameters n and g determine the filter characteristic, and thereby the effective bandwidth of the DPLL 62. Thus the state machine 64 can operate to select wide or narrow bandwidth operating modes of the DPLL 62, as required, by selecting appropriate values for the parameters n and g. If desired, the required parameter values (for both wide and narrow bandwidth operating modes) can be predetermined and stored in a memory (not shown) for use during run-time of the state machine 64.

The output of the digital filter 72 is a multi-bit error value that is directly proportional to the rate of "slippage" of the SPE within the STS frame as it traverses the optical network, measured in bits-per-pointer (or, equivalently, bits-per-tributary). This error value can be normalized (at 66) to a low noise estimate of the frequency difference (Δf) by dividing the error value by the tributary length (in bits).

As may be appreciated, in order to properly account for frequency differences between SONET islands, the DPLL 62 must be able to acquire the SPE frequency within a comparatively wide pull-in range (e.g., on the order of about 10 Hz). However, once the SPE frequency has been acquired, the DPLL 62 must be able to maintain phase lock within a range of about 0.0025 Hz, in order to satisfy standard MTIE ANSI specifications for normal operation.

In general, the state machine 64 operates to select the appropriate DPLL bandwidth based on the phase error estimate (PE) and a frequency estimate (FE) derived from the pointer changes received from the pointer processor 34. The frequency estimate (FE) may be calculated (at 74) using an equation of the form $$FE = \frac{\text{sign} \cdot L}{\text{Count}},$$

where: "Sign" is the sign of the pointer change (e.g. positive or negative); L is the stuff word size (in bits); and "Count" is an integer count of received payload pointers between successive pointer changes. Thus the frequency estimate (FE) provides an estimate of the relative difference between the STS frame rates at the originating and terminating nodes, measured in bits-per-pointer (or, equivalently, bits-per-SPE tributary). This frequency estimate (FE) is sufficiently accurate to permit the DPLL 62 (operating in the narrow bandwidth mode) to acquire phase lock within the size of a conventional elastic store FIFO 36. If desired, the frequency estimate (FE) can be recalculated for each successive payload pointer, which means that the value will be updated for each tributary. Jitter in the frequency estimate (FE) value can be reduced by using an average count value calculated over a desired number of successive pointer changes.

Figure 4:
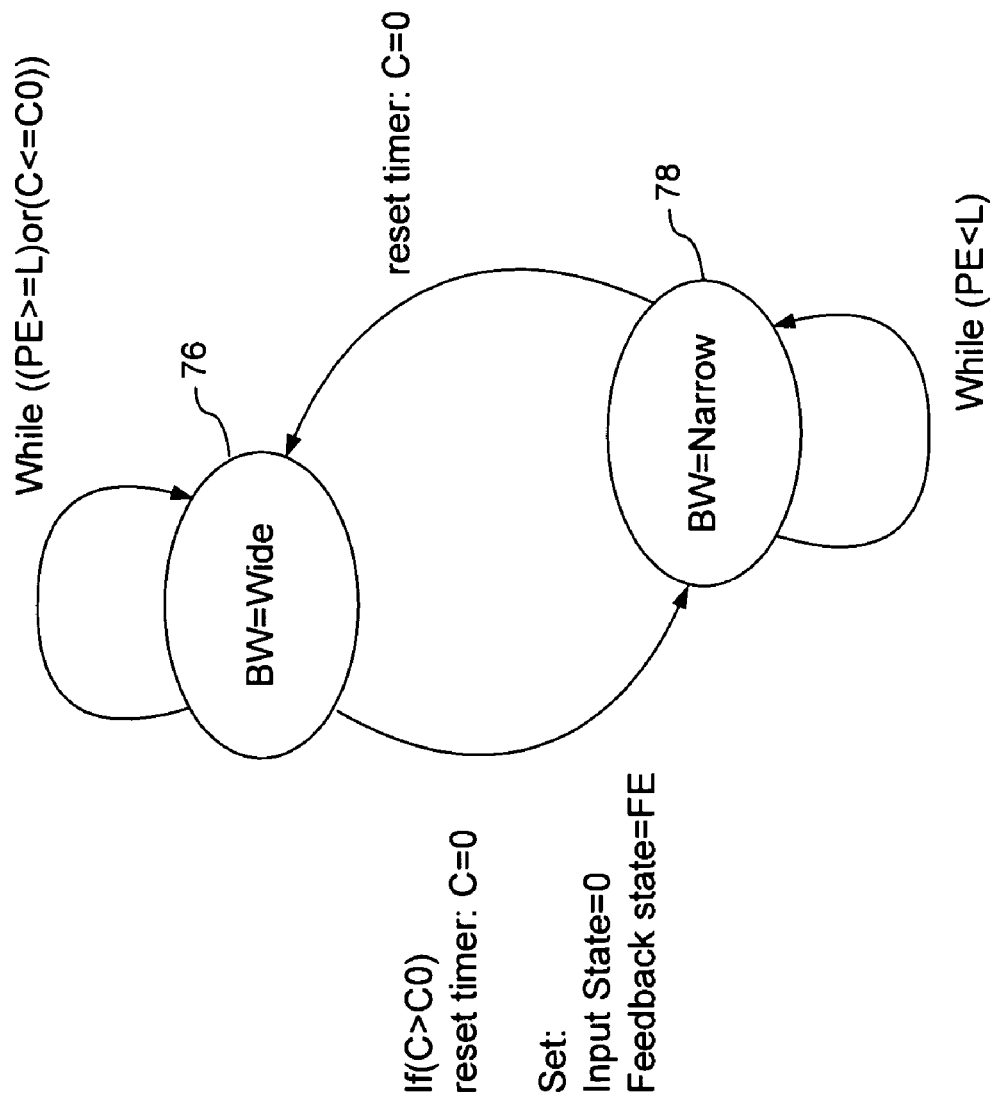
FIG. 4 is a state diagram schematically illustrating operating modes of the state machine of the embodiment of FIG. 3.

As shown in FIG. 4, the state machine 64 transitions between a wide bandwidth state 76 and a narrow bandwidth state 78, depending on the value of the phase error estimate (PE), and a timer value C. A timer 80 (FIG. 3) is used to ensure that the state machine 64 remains in one state for a predetermined minimum period of time (such as, for example, Co=20 seconds) before transitioning to the other state. This is advantageous in that it prevents erroneous operation of the state machine 64 rapidly oscillating between states.

During initialization (e.g. during system start-up), the state machine 64 enters the Wide bandwidth state 78 in order to acquire the SPE frequency and pull the phase error estimate (PE) close to zero. While the phase error estimate (PE) is equal to or greater than a predetermined threshold (such as, for example, the stuff word size L) the state machine 64 remains in the Wide bandwidth state 78. Within the Wide bandwidth state 78, the state machine 64 selects appropriate "wide bandwidth" parameter values n and g, and supplies these values to the digital filter 72 of the DPLL 62, to yield a DPLL bandwidth of, for example, about 10 Hz. Under these conditions, the impulse response of the DPLL 62 satisfies the short term MTIE specification for phase transients, while the jitter performance meets the network limit requirements.

When the phase error estimate (PE) drops below the predetermined threshold (e.g. the stuff word size L), the state machine 64 transitions to the narrow bandwidth state 78. If the current timer value C is greater than the predetermined limit Co (e.g. 20 seconds), the timer 80 is reset to C=0. In addition, the input state is set to zero, and the feedback state is set to the frequency estimate (FE).

Within the narrow bandwidth state 78, the state machine 64 selects appropriate "narrow bandwidth" parameter values n and g, and supplies these values to the digital filter 728 of the DPLL 62, to yield a DPLL bandwidth of, for example, about 0.0025 Hz. With this arrangement, the impulse response of the DPLL 62 meets the short term MTEI ANSI specification for normal operation. As long as the phase error estimate (PE) remains below the threshold, the state machine 64 will remain in the narrow bandwidth state 78. If the phase error estimate (PE) rises above the threshold, which may, for example, occur during a change in the SONET Primary Reference frequency, the state machine will return to the wide bandwidth state 76 in order to reacquire the SPE rate.

An advantageous feature of the present invention is that pointer changes are digitally processed independently of the desynchronizer circuit (formed by the pointer processor 34, elastic store 38, desynchronizer PLL 54 and desynchronizer framer 48). Digitally processing the pointer changes independently of the subscriber data enables this separation. A benefit of this separation is that it enables independent optimization of pointer and data desynchronization functions. This attribute is significant since the performance requirements for the pointer changes and data desynchronization are typically different, and the nature of degradations are unique. An additional benefit of the present invention is that, because pointer changes are digitally filtered directly, the data elastic store fill signal with its associated hazards of clock noise, cross-talk, and data patterning is avoided.

The solution of the present invention also enables the important advantage that two different bandwidths for pointer change processing and data synchronization can be maintained simultaneously. Thus, for example, bandwidths of less than 100 mHz can be maintained in the pointer filter DPLL 62 to meet the stringent SONET standards (e.g. for SONET over SONET applications), while the desynchronizer PLL 54 bandwidth can be very wide to facilitate transparency.

As discussed in detail above, pointers of a received STS signal are processed to generate a multibit estimate of the frequency difference ($\Delta f$) between the respective local clocks at the originating and terminating nodes of a SONET path. This information can be used in various ways, including (without limitation):

the frequency difference ($\Delta f$) can be provided to a network management system (not shown) and used for monitoring network clock synchronization quality. For example the frequency difference ($\Delta f$) can be compared to a predetermined threshold, and an alarm raised if the threshold is exceeded;

the frequency difference ($\Delta f$) can be used in combination with the frequency estimate (FE) and estimated phase error (PE) to enable intelligent handling of payload pointers by the pointer processor. For example, pointer arrival events can be classified (e.g. as being due to the frequency difference $\Delta f$ or burst effects such as SONET primary reference changes etc.) and handled by different digital signal processing methods based on the classification result; and the frequency difference ($\Delta f$) can be used to adjust the Rx local reference frequency f3, and thereby improve network transparency.

Figure 1A:
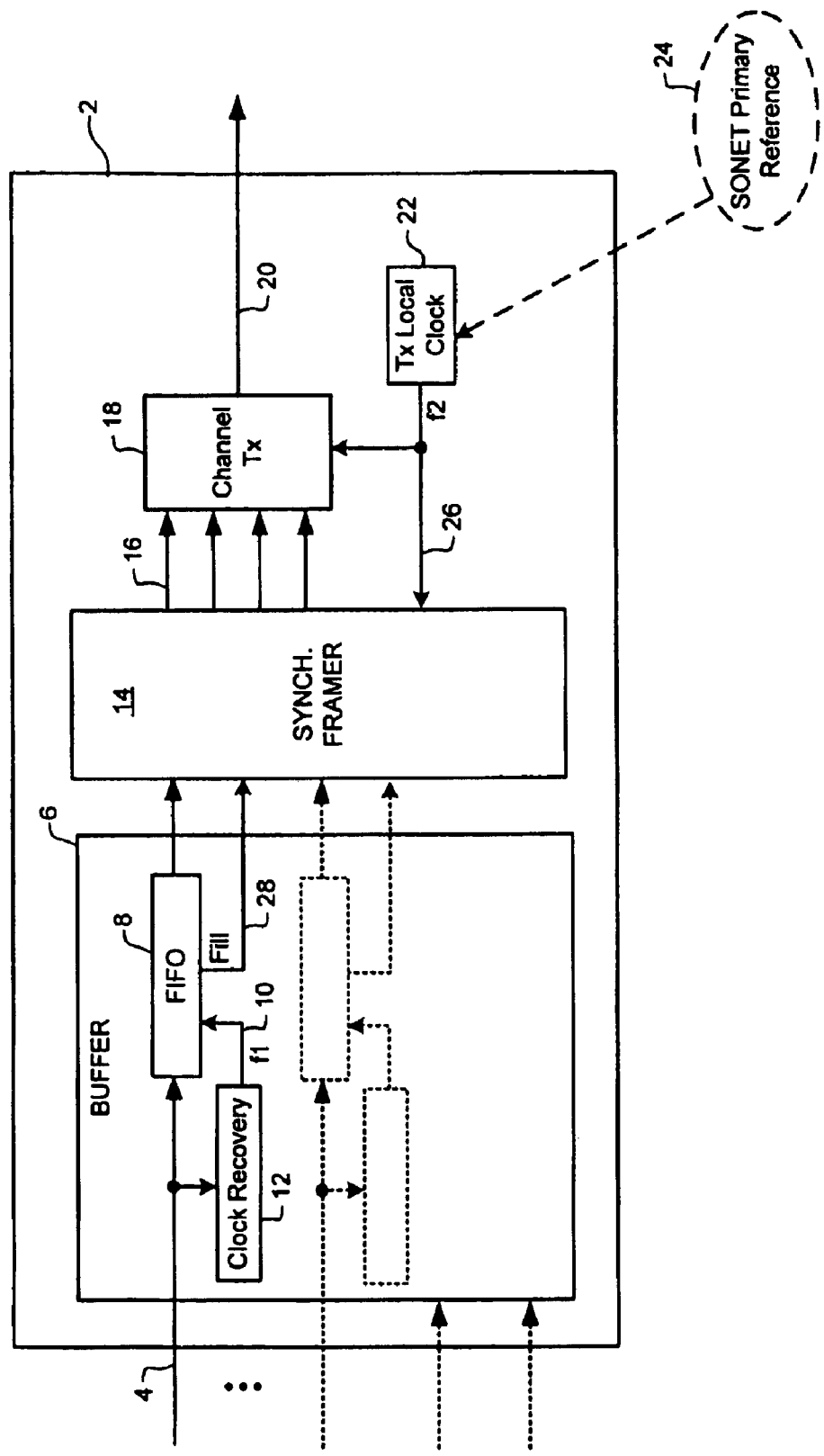
FIGS. 1a and 1b are block diagrams schematically illustrating conventional originating and terminating nodes, respectively, of an optical communications network.
Figure 1B:
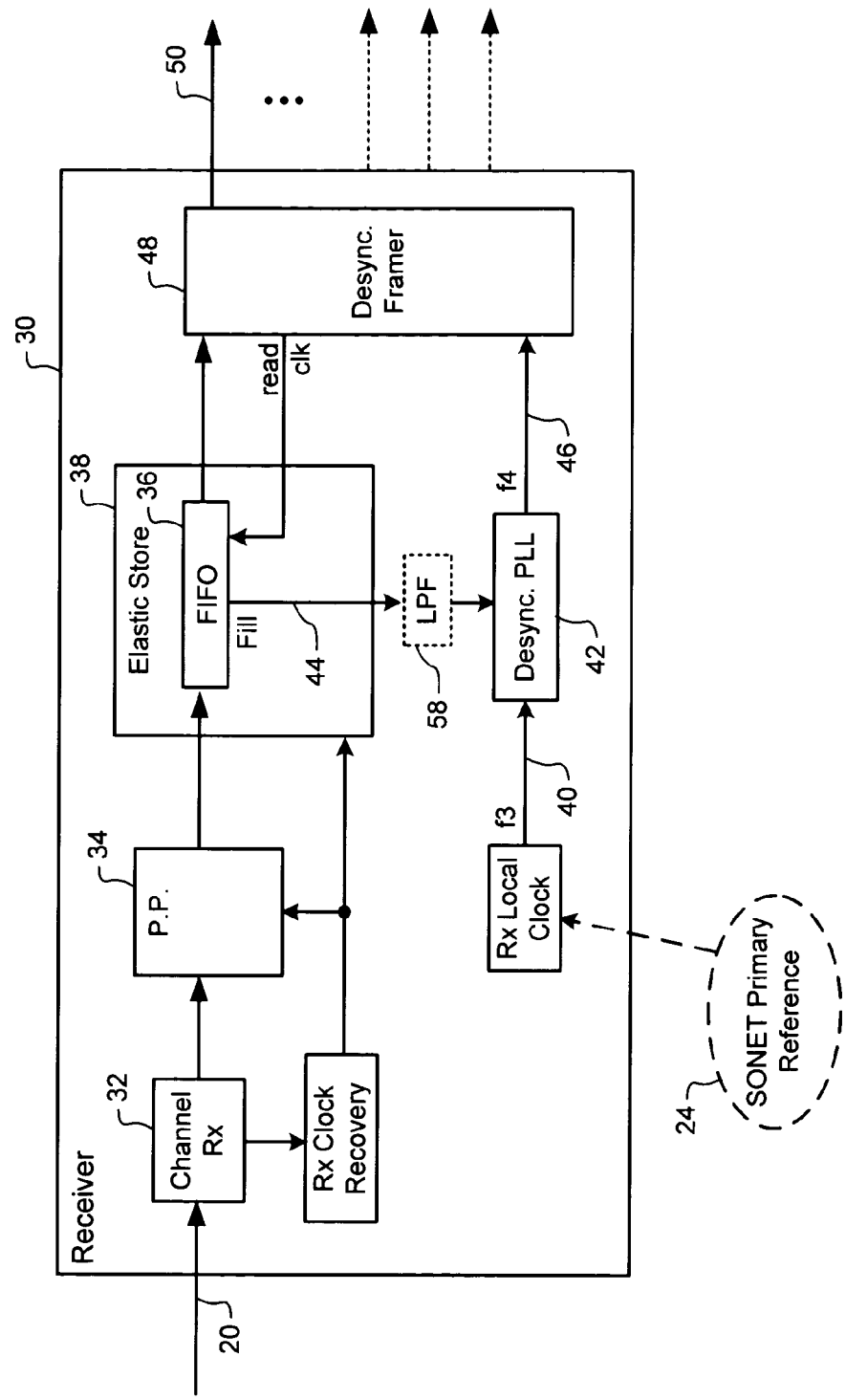
Figure 2A:
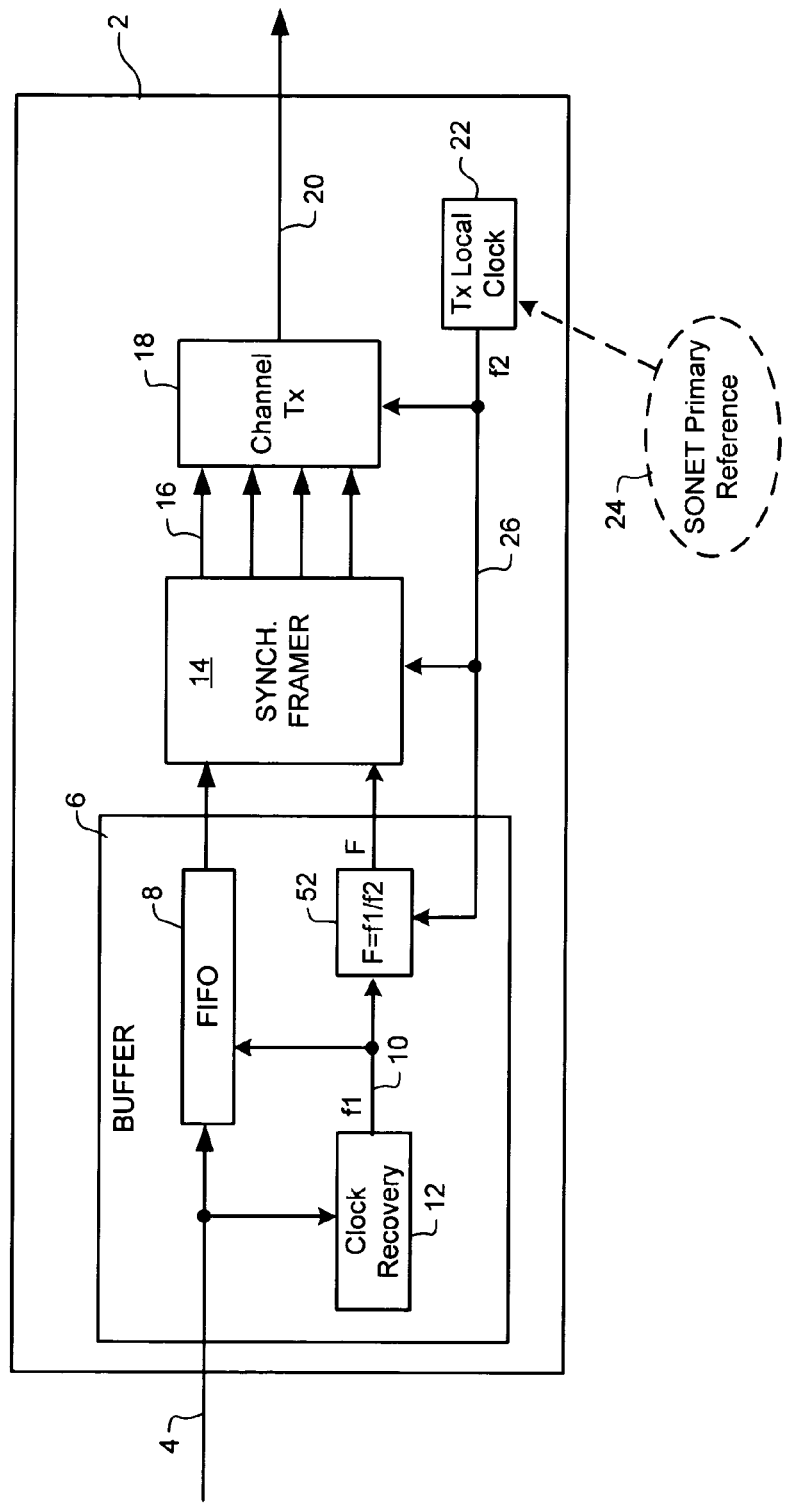
FIGS. 2a and 2b are block diagrams schematically illustrating originating and terminating nodes, respectively, known from U.S. patent application Ser. No. 09/972,686.
Figure 2B:
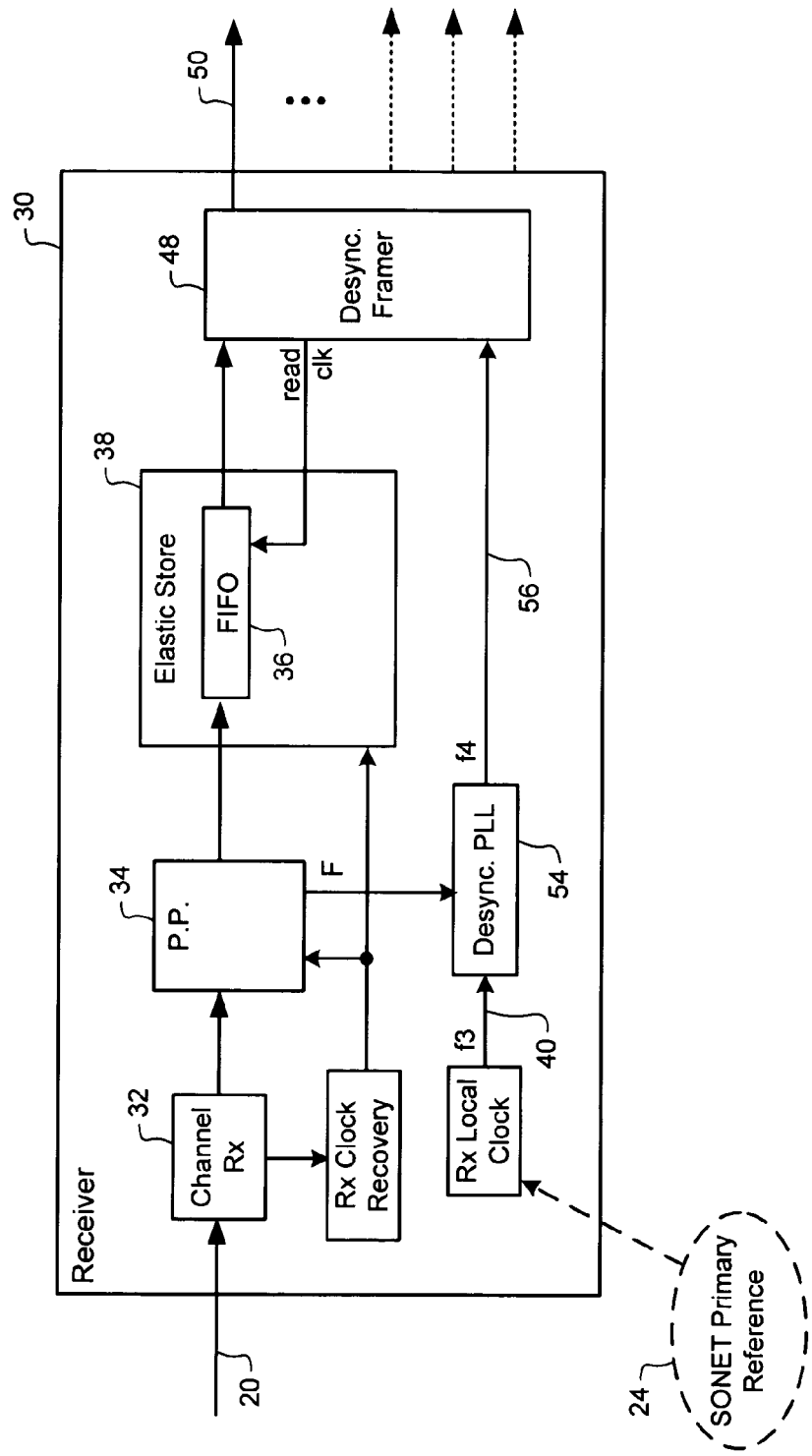
Figure 5:
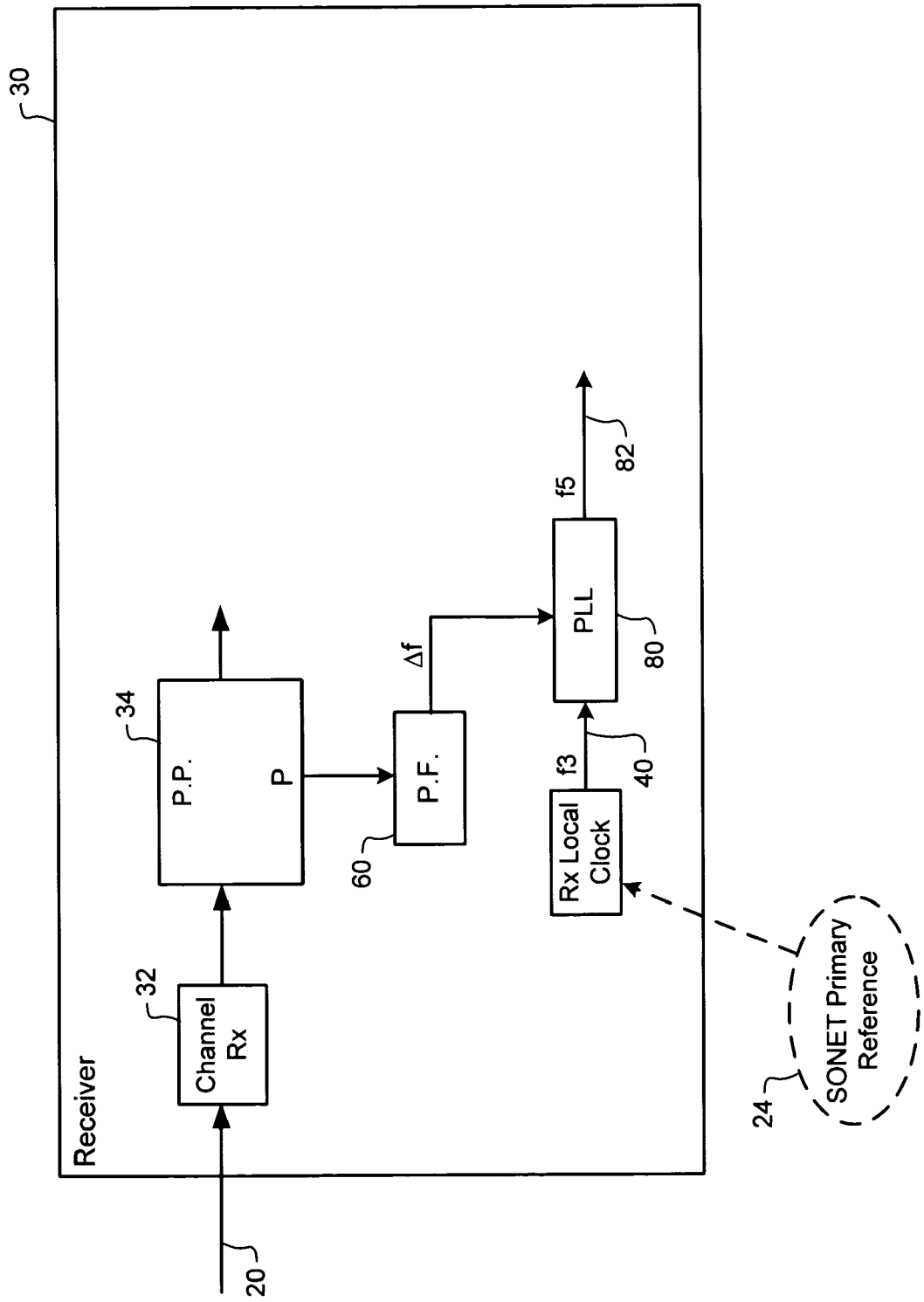
FIG. 5 is a block diagram schematically illustrating a terminating node employing a pointer filter in accordance with the embodiment of FIG. 3 used to steer a phase locked loop.

In the embodiment of FIG. 5, the frequency difference ($\Delta f$) is used to steer a PLL 80 to generate an adjusted clock signal 82 having a frequency f5 which closely approximates the Tx local clock frequency f1. If desired, the PLL 80 could be cascaded with the desynchronizer PLL 54 of the prior art transparent desynchroniser illustrated in FIG. 2b. With this arrangement, the frequency f4 of the recovered clock signal 56 generated by the desynchronizer PLL 54 would approximate the frequency f1 of the subscriber traffic, to an arbitrary degree of accuracy. A limitation of this approach is that two cascaded Phase Locked Loop circuits are required, which increases the risk of noise in the frequency f4 of the recovered clock signal 56. Alternatively, the frequency difference ($\Delta f$) can be combined with the subscriber signal timing value (F) to generate a frequency offset value (FO), which is then used to steer a single desynchronizer PLL 54. Such an embodiment is described below with reference to FIG. 6.

Figure 6:
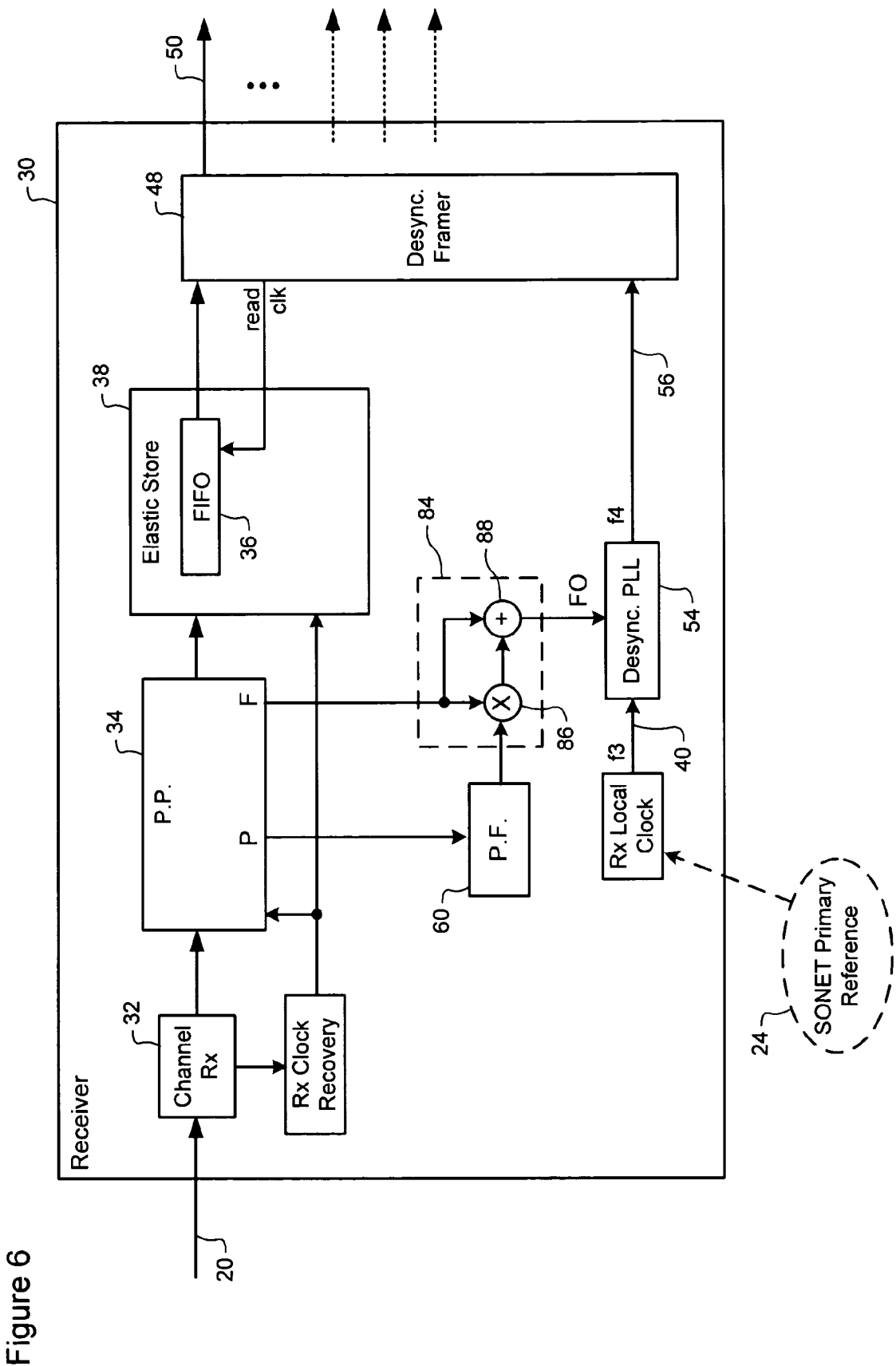
FIG. 6 is a block diagram schematically illustrating the terminating node of FIG. 2b employing a pointer filter in accordance with the embodiment of FIG. 3.

As shown in FIG. 6, a terminating node 30a in accordance with the present invention operates in a manner that is generally similar to that described above with reference to FIG. 2b. Thus, the pointer processor 34 demaps each SPE tributary from a received STS 20, and extracts the timing estimate F. However, the pointer processor 34 also extracts pointer changes, which are filtered by the pointer filter 60 in the manner described above with reference to FIGS. 3 and 4. In the illustrated embodiment, the frequency difference ($\Delta f$) generated by the pointer filter 60 is used as a "scaling factor" for the timing estimate F, to thereby yield a frequency offset value (FO) which accounts for both the frequency difference between the original subscriber data signal frequency f1 and the Tx reference frequency f2, and between the Tx reference frequency f2 and the Rx reference frequency f3. Accordingly, the difference estimate ($\Delta f$) and the timing estimate F are supplied to a digital combiner 84, which calculates the frequency offset FO.

As shown in FIG. 6, the digital combiner 84 comprises a multiplier 86, which normalizes the difference estimate ($\Delta f$) to the timing estimate F, and a digital ADDER 88 which then adds the normalized difference estimate to the timing estimate F, to yield the frequency offset (FO).

The frequency offset (FO) is then used to steer the desynchronizer Phase locked Loop (PLL) 54, so that the PLL output constitutes a recovered clock signal 56 having a frequency f4 which approximates the original frequency f1 of the subscriber traffic to an arbitrary degree of accuracy. As a result, by reading subscriber data from the tributary FIFO 36 at a timing of the recovered clock 56, the desynchronizer framer 48 can generate a recovered subscriber signal 50 in which the original timing is restored, again, to an arbitrary degree of accuracy.

In the foregoing description, the DPLL 62 is controlled by a state machine 64 to switch between wide and narrow band operation, based on an estimated phase error of the SPE within the received STS frame. As mentioned above, the bandwidth of the DPLL 62 is controlled via the filter characteristic of the digital filter 72. Accordingly, while a dual bandwidth DPLL is described, those of ordinary skill in the art will appreciate that any desired number of different bandwidths may be implemented, by suitably controlling the digital filter 72.

The embodiment(s) of the invention described above is (are) intended to be exemplary only. The scope of the invention is therefore intended to be limited solely by the scope of the appended claims.

We claim:

1. A method of estimating a bit rate (f1) of a digital signal conveyed through a SONET network between an originating node and a terminating node, the method comprising steps of:
   receiving the digital signal at the originating node, and calculating a result of a first function of the signal bit rate (f1) and a respective Tx local reference frequency (f2) of the originating node;
   calculating a result of a second function of the Tx local reference frequency (f2) and a respective Rx local reference frequency (f3) of the terminating node; and
   calculating a result of a third function of the respective first and second function results, to derive an estimate of the signal bit rate (f4) relative to the Rx local reference frequency (f3).

2. A method as claimed in claim 1, wherein the first function comprises any one or more of
   a ratio between the signal bit rate (f1) and the Tx local reference frequency (f2); and
   a difference between the signal bit rate (f1) and the Tx local reference frequency (f2).

3. A method as claimed in claim 1, wherein the third function comprises any one or more of a product and a sum.

4. A method as claimed in claim 1, wherein the second function comprises any one or more of:
   a ratio between the Tx local reference frequency (f2) and the Rx local reference frequency (f3); and
   a difference between the Tx local reference frequency (f2) and the Rx local reference frequency (f3).

5. A method as claimed in claim 4, wherein the step of determining the second function result comprises steps of:
   receiving an STS/STM signal conveyed through the network between the originating and terminating nodes;
   processing each successive payload pointer of the received STS/STM signal to generate a corresponding pointer parameter; and
   digitally filtering the pointer parameters to derive the second function result.

6. A method as claimed in claim 5, wherein the pointer parameters are digitally filtered independently of a phase of payload data of the STS/STM signal.

7. A method as claimed in claim 6, wherein the step of processing each successive payload pointer comprises, for each payload pointer, steps of:
   detecting a respective sign of a pointer change indicated by the payload pointer; and
   generating the corresponding pointer parameter that is representative of the detected sign.

8. A method as claimed in claim 7, wherein the sign of the pointer change comprises any one of: positive, negative and zero.

9. A method as claimed in claim 5, wherein the step of digitally filtering the pointer parameter comprises steps of:
   providing a digital phase lock loop (DPLL) for digitally processing the pointer parameters; and
   controlling a bandwidth of the DPLL.

10. A method as claimed in claim 9, wherein the step of controlling the bandwidth of the DPLL comprises steps of:
    estimating a phase error of the payload data;
    comparing the phase error estimate to a predetermined threshold; and
    selecting the bandwidth of the DPLL based on the comparison result.

11. A method as claimed in claim 10, wherein the predetermined threshold is based on a size of a stuff word.

12. A method as claimed in claim 10, wherein the step of selecting the bandwidth of the DPLL comprises steps of:
    selecting a narrow bandwidth state of the DPLL when the phase error is less than the predetermined threshold; and
    selecting a wide bandwidth state of the DPLL when the phase error is greater than the predetermined threshold.

13. A method as claimed in claim 9, wherein the step of controlling the bandwidth of the DPLL comprises steps of:
    estimating a pointer change rate; and
    controlling the bandwidth of the DPLL based on the estimated pointer change rate.

14. A method of estimating a relationship between a Tx local reference frequency (f2) of an originating node and an Rx local reference frequency (f3) of a terminating node of a SONET network, the method comprising steps of:
    receiving an STS/STM signal conveyed through the network between the originating and terminating nodes;
    processing each successive payload pointer of the received STS/STM signal to generate a corresponding pointer parameter; and
    digitally filtering the pointer parameters to derive an estimate of the relationship between the Tx local reference frequency (f2) and the Rx local reference frequency (f3).

15. A method as claimed in claim 14 wherein the derived relationship comprises any one or more of:
    a ratio between the Tx local reference frequency (f2) and the Rx local reference frequency (f3); and
    a difference between the Tx local reference frequency (f2) and the Rx local reference frequency (f3).

16. A method as claimed in claim 14, wherein the pointer parameter is digitally filtered independently of payload data of the STS/STM signal.

17. A method as claimed in claim 14, wherein the step of processing each successive payload pointer comprises, for each payload pointer, steps of:
    detecting a respective sign of a pointer change indicated by the payload pointer; and
    generating the corresponding pointer parameter that is representative of the detected sign.

18. A method as claimed in claim 17, wherein the sign of the pointer change comprises any one of: positive, negative and zero.

19. A method as claimed in claim 14, wherein the step of digitally filtering the pointer parameter comprises steps of:
providing a digital phase lock loop (DPLL) for digitally processing the pointer parameters; and
controlling a bandwidth of the DPLL.

20. A method as claimed in claim 19, wherein the step of controlling the bandwidth of the DPLL comprises steps of:
estimating a phase error of the payload data;
comparing the phase error estimate to a predetermined threshold; and
selecting the bandwidth of the DPLL based on the comparison result.

21. A method as claimed in claim 20, wherein the predetermined threshold is based on a size of a stuff word.

22. A method as claimed in claim 20, wherein the step of selecting the bandwidth of the DPLL comprises steps of:
selecting a narrow bandwidth state of the DPLL when then the phase error is less than the predetermined threshold; and
selecting a wide bandwidth state of the DPLL when then the phase error is greater than the predetermined threshold.

23. A method as claimed in claim 19, wherein the step of controlling the bandwidth of the DPLL comprises steps of:
estimating a pointer change rate; and
controlling the bandwidth of the DPLL based on the estimated pointer change rate.

24. A method as claimed in claim 15, further comprising a step of adjusting the Rx local reference frequency (f3) using the estimated frequency difference, to generate a recovered clock signal having a frequency (f4) that closely approximates the Tx SONET clock frequency (f2) of the originating node.

25. A method as claimed in claim 24, wherein the step of adjusting the Rx local reference frequency comprises steps of:
providing a desynchronizer phase locked loop (PLL) for generating a recovered clock signal based on the local SONET clock frequency; and
steering the desynchronizer PLL using the estimated frequency difference.

26. A method as claimed in claim 15, further comprising a step of controlling an operation of a pointer processor based on the estimated frequency difference.

27. A method as claimed in claim 26, wherein the step of controlling an operation of a pointer processor comprises steps of:
classifying pointer arrival events using the estimated frequency difference; and
selecting a method for handling each pointer arrival event based on the classification result.

28. A method as claimed in claim 15, further comprising a step of monitoring network clock synchronization quality, based on the estimated frequency difference.

29. A method as claimed in claim 28, wherein the step of monitoring network clock synchronization quality comprises a step of comparing the estimated frequency difference to a predetermined threshold.

30. A method of desynchronizing asynchronous subscriber traffic conveyed through a synchronous network, the method comprising steps of:
receiving an STS/STM signal encapsulating the subscriber traffic at a terminating node of the network, the STS/STM signal including a timing estimate (F) indicative of a frequency difference between a data rate (f1) of the subscriber traffic and a Tx local reference frequency (f2) of an originating node of the network;
buffering the encapsulated subscriber traffic within an elastic store;
processing each successive payload pointer of the received STS/STM signal to generate a corresponding pointer parameter;
digitally filtering the pointer parameters to derive an estimated relationship between the Tx local reference frequency (f2) and an Rx local reference frequency (f3) of the terminating node;
adjusting the Rx local reference frequency (f3) using the timing estimate (F) and the estimated relationship, to generate a recovered clock signal having a frequency (f4) that substantially equals the data rate (f1) of the subscriber traffic; and
reading the buffered asynchronous subscriber traffic at a timing of the recovered clock signal.

31. A method as claimed in claim 30, wherein the derived relationship comprises any one or more of:
a ratio between the Tx local reference frequency (f2) and the Rx local reference frequency (f3); and
a difference between the Tx local reference frequency (f2) and the Rx local reference frequency (f3).

32. A method as claimed in claim 30, wherein the pointer parameter is digitally filtered independently of payload data of the STS/STM signal.

33. A method as claimed in claim 30, wherein the pointer parameters comprise, for each payload pointer of the received STS/STM signal, a respective indication of a sign of the pointer change.

34. A method as chimed in claim 33, wherein the sign of the pointer change comprises any one of: positive, negative and zero.

35. A method as claimed in claim 30, wherein the step of digitally filtering the pointer parameters comprises steps of:
providing a digital phase lock loop (DPLL) for digitally processing the pointer parameters; and
controlling a bandwidth of the DPLL.

36. A method as claimed in claim 35, wherein the step of controlling the bandwidth of the DPLL comprises steps of:
estimating a phase error of an SPE of the STS/STM signal;
comparing the phase error estimate to a predetermined threshold; and
controlling the bandwidth of the DPLL based on the comparison result.

37. A method as claimed in claim 36, wherein the predetermined threshold is based on a size of a stuff word.

38. A method as claimed in claim 36, wherein the step of selecting the bandwidth of the DPLL comprises steps of:
selecting a narrow bandwidth state of the DPLL when the phase error is less than the predetermined threshold; and
selecting a wide bandwidth state of the DPLL when the phase error is greater than the predetermined threshold.

39. A method as claimed in claim 35, wherein the step of controlling the bandwidth of the DPLL comprises steps of:
estimating a pointer change rate; and
controlling the bandwidth of the DPLL based on the estimated pointer change rate.

40. A method as claimed in claim 30, wherein the step of adjusting the Rx local reference frequency (f3) comprises steps of:
providing a desynchronizer phase locked loop (PLL) for generating the recovered clock signal based on the local reference frequency (f3);
deriving a frequency offset value (FO) based on the timing estimate (F) and the estimated relationship between the Tx local reference frequency (f2) and the Rx local reference frequency (f3); and steering the desynchronizer PLL using the frequency offset value (FO).

41. A system for estimating a relationship between respective local reference frequencies of originating and terminating nodes of a SONET network, the system comprising:

a pointer processor for processing each successive payload pointer of an STS/STM signal received at the terminating node to generate a corresponding pointer parameter; and a pointer filter for digitally filtering the pointer parameters to derive an estimated relationship between a Tx local reference frequency (f2) of the originating node and an Rx local reference frequency (f3) of the terminating node.

42. A system as claimed in claim 41, wherein the derived relationship comprises any one or more of:

a ratio between the Tx local reference frequency (f2) and the Rx local reference frequency (f3); and a difference between the Tx local reference frequency (f2) and the Rx local reference frequency (f3).

43. A system as claimed in claim 41, wherein the pointer parameter is digitally filtered independently of payload data of the STS/STM signal.

44. A system as claimed in claim 41, wherein the pointer processor comprises means for detecting a respective sign of a pointer change indicated by the payload pointer; and means for generating the corresponding pointer parameter that is representative of the detected sign.

45. A system as claimed in claim 44, wherein the sign of the pointer change comprises any one of: positive, negative and zero.

46. A system as claimed in claim 41, wherein the pointer filter comprises:

a digital phase lock loop (DPLL) for digitally processing the pointer parameters; and means for controlling a bandwidth of the DPLL.

47. A system as claimed in claim 46, wherein the means for controlling a bandwidth of the DPLL comprises:

a phase error calculator for estimating a phase error of an SPE of the STS signal; and as state machine for:

comparing the phase error estimate to a predetermined threshold; and selecting the bandwidth of the DPLL based on the comparison result.

48. A system as claimed in claim 47, wherein the predetermined threshold is based on a size of a stuff word.

49. A system as claimed in claim 41, further comprising:

a desynchronizer phase locked loop (PLL) for generating a recovered clock signal based on the Rx local frequency (f3); and means for steering the desynchronizer PLL using the estimated relationship so as to generate a recovered clock signal having a frequency (f4) that closely approximates the Tx local reference frequency (f2) of the originating node.

50. A system for desynchronizing asynchronous subscriber traffic conveyed through a synchronous network, the system comprising:

a receiver for receiving an STS/STM signal encapsulating the subscriber traffic at a terminating node, the STS signal including a timing estimate (F) indicative of a first relationship between a data rate (f1) of the subscriber traffic and a Tx local reference frequency (f2) of an originating node;

an elastic store for buffering the encapsulated subscriber traffic;

a pointer processor for processing each successive payload pointer of the received STS/STM signal to generate a corresponding pointer parameter;

a pointer filter for digitally filtering the pointer parameters to derive an estimated second relationship between a Tx local reference frequency (f2) of the originating node and an Rx local reference frequency (f3) of the terminating node;

means for adjusting the Rx local reference frequency (f3) using the first and second relationships, to generate a recovered clock signal having a frequency (f4) that substantially equals the data rate (f1) of the subscriber traffic; and a desynchronizer framer for reading the buffered subscriber traffic at a timing of the recovered clock signal.

51. A system as claimed in claim 50, wherein the derived relationship comprises any one or more of:

a ratio between the Tx local reference frequency (f2) and the Rx local reference frequency (f3); and a difference between the Tx local reference frequency (f2) and the Rx local reference frequency (f3).

52. A method as claimed in claim 50, wherein the pointer parameter is digitally filtered independently of payload data of the STS/STM signal.

53. A system as claimed in claim 50, wherein the pointer parameters comprise, for each payload pointer of the received STS signal, a respective indication of a sign of the pointer change.

54. A system as claimed in claim 53, wherein the sign of the pointer change comprises any one of: positive, negative and zero.

55. A system as claimed in claim 50, wherein the pointer filter comprises:

a digital phase lock loop (DPLL) for digitally processing the pointer change indications; and means for controlling a bandwidth of the DPLL.

56. A system as claimed in claim 55, wherein the means for controlling a bandwidth of the DPLL comprises:

a phase error calculator for estimating a phase error of an SPE of the STS/STM signal; and a state machine for:

comparing the phase error estimate to a predetermined threshold; and controlling the bandwidth of the DPLL based on the comparison result.

57. A system as claimed in claim 56, wherein the predetermined threshold is based on a size of a stuff word.

58. A system as claimed in claim 50, wherein the means for adjusting the Rx local reference frequency (f3) comprises:

a digital combiner for deriving a frequency offset value (FO) based on the timing estimate (F) and the estimated second relationship; and a desynchronizer phase locked loop (PLL) for generating the recovered clock signal based on the Rx local reference frequency (f3) and the frequency offset value (FO).

* * * * *